(12) United States Patent
Mariani et al.

(10) Patent No.: US 11,965,736 B2
(45) Date of Patent: Apr. 23, 2024

(54) MEASUREMENT ROUTINE MOTION REPRESENTED BY 3D VIRTUAL MODEL

(71) Applicant: Hexagon Metrology, Inc., North Kingstown, RI (US)

(72) Inventors: Michael Mariani, North Kingstown, RI (US); Milan Kocic, Pawtucket, RI (US)

(73) Assignee: Hexagon Metrology, Inc., North Kingstown, RI (US)

( * ) Notice: Subject to any disclaimer, the term of this patent is extended or adjusted under 35 U.S.C. 154(b) by 724 days.

(21) Appl. No.: 17/006,269

(22) Filed: Aug. 28, 2020

(65) Prior Publication Data

US 2021/0064015 A1 Mar. 4, 2021

Related U.S. Application Data

(60) Provisional application No. 62/892,574, filed on Aug. 28, 2019.

(51) Int. Cl.
*G01B 5/008* (2006.01)
*G01B 11/00* (2006.01)
*G05B 19/418* (2006.01)

(52) U.S. Cl.
CPC ............ *G01B 5/008* (2013.01); *G01B 11/005* (2013.01); *G05B 19/41805* (2013.01); *G05B 19/41865* (2013.01); *G05B 19/4188* (2013.01); *G05B 19/41885* (2013.01)

(58) Field of Classification Search
CPC .............................. G01B 11/005; G01B 5/008
USPC ........................................................... 702/94
See application file for complete search history.

(56) References Cited

U.S. PATENT DOCUMENTS

| | | | |
|---|---|---|---|
| 8,982,156 B2 | 3/2015 | Maggiore | |
| 2006/0069527 A1* | 3/2006 | Numata | G06T 17/10 |
| | | | 702/168 |
| 2015/0204653 A1* | 7/2015 | Przygodda | G01B 21/045 |
| | | | 33/503 |
| 2016/0033960 A1* | 2/2016 | Pinkston | G05B 19/4097 |
| | | | 702/84 |
| 2016/0349034 A1* | 12/2016 | Cobb | G01B 11/005 |
| 2016/0364913 A1 | 12/2016 | Montaigne et al. | |
| 2017/0067737 A1* | 3/2017 | Yu | G05B 19/4097 |
| 2017/0316610 A1 | 11/2017 | Lin et al. | |
| 2018/0060663 A1 | 3/2018 | Baskin et al. | |

* cited by examiner

*Primary Examiner* — Ricky Go
(74) *Attorney, Agent, or Firm* — Nutter McClennen & Fish LLP (57) ABSTRACT

A method measures a given object using a coordinate measuring machine (CMM) having a measurement space. As such, the method determines one or more portions of the given object to be measured and then forms a virtual 3D movement model representing CMM movement required to measure the one or more portions. The method then uses the 3D movement model to virtually position and orient the given object within the CMM measurement space.

20 Claims, 9 Drawing Sheets

MEASUREMENT ROUTINE MOTION REPRESENTED BY 3D VIRTUAL MODEL

PRIORITY

This patent application claims priority from provisional U.S. patent application number 62/892,574, filed Aug. 28, 2019, entitled, "MEASUREMENT ROUTINE MOTION REPRESENTED BY 3D VIRTUAL MODEL," and naming Michael Mariani, and Milan Kocic as inventors, the disclosure of which is incorporated herein, in its entirety, by reference.

FIELD OF THE INVENTION

Illustrative embodiments of the invention generally relate to coordinate measuring machines and, more particularly, illustrative embodiments relate to positioning an object in a measurement space of a coordinate measuring machine.

BACKGROUND OF THE INVENTION

Coordinate measuring machines (CMMs) are the standard for accurately measuring a wide variety of different types of physical objects/work pieces. For example, CMMs can measure critical dimensions of aircraft engine components (e.g., jet engine blades), surgical tools, and gun barrels. Precise and accurate measurements help ensure that their underlying systems, such as an aircraft in the case of aircraft components, operate as specified.

Prior to use, a technician or robot positions and orients the object to be measured in a measurement space of a CMM. This can be an iterative and time consuming process to ensure proper measurement.

SUMMARY OF VARIOUS EMBODIMENTS

In accordance with one embodiment of the invention, a method measures a given object using a coordinate measuring machine (CMM) having a measurement space. As such, the method determines one or more portions of the given object to be measured and then forms a virtual 3D movement model representing CMM movement required to measure the one or more portions. The method then uses the 3D movement model to virtually position and orient the given object within the CMM measurement space.

The method may use the 3D virtual movement model to virtually coordinate the given object with a fixture. For example, the method may virtually couple or contact the fixture to one or more surfaces of the given object. The method further may combine the virtual object model and the virtual 3D movement model. As such, this may identify (e.g., graphically or via data) one or more portions of the given object that are available for support but will not interfere with movement of the CMM. For example, the method may display the combined virtual object model and the virtual movement volume model to determine the one or more object portions for support.

Some embodiments produce the fixture as a function of the virtual movement volume model. In addition or alternatively, the method may validate the virtual position and orientation of the given object within the CMM measurement space. The method then may make a fixture as a function of the validation.

Illustrative embodiments may virtually position a second virtual movement volume model in the CMM measurement space for a second object to be measured. The method then may modify the position and/or orientation of the given and/or second 3D virtual movement model when the second virtual movement volume model overlaps with the given object of the given virtual movement volume model. In a corresponding manner, the method may modify the position and/or orientation of the given and/or second virtual movement volume model when the given 3D virtual movement model overlaps with the second object of the second virtual movement volume model.

After the object is virtually positioned and virtually oriented, the method may measure the given object. Moreover, since the CMM may have a probe, movement of the CMM required to measure the one or more portions may include movement of the CMM probe.

In accordance with another embodiment, a system measures a plurality of objects with a CMM. The CMM has movable components and a base on which the objects are positioned. The system includes an object model configured to represent an object. The system also has a scan-path generator configured to generate a scan path for one or more features of the object to be measured. A movement-volume engine is configured to generate a virtual movement volume model representing movement of the movable components of the CMM required to measure the one or more features. The system further includes a positioning engine configured to determine a position and an orientation of the object on a base of the CMM. The position and orientation is such that the virtual movement volume model does not have interference from a fixture of the object and/or a second object positioned on the base.

Among other things, the system may include a measurement module configured to efficiently measure a plurality of objects on the base. The system may also include a CMM. Furthermore, the system may include a second object model configured to represent a second object. Accordingly, the movement-volume engine is configured to generate a second virtual movement volume model.

Additionally, the positioning engine is further configured to determine a position and an orientation of the first object and the second object on the base, such that the first virtual movement volume model and the second virtual movement volume model do not have interference from the fixture of the object, the fixture of the second object, the object, and/or the second object. In some embodiments, the second object model is different from the first object model.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DESCRIPTION OF ILLUSTRATIVE EMBODIMENTS

Illustrative embodiments determine an efficient arrangement of multiple objects within a measurement space of a coordinate measuring machine (CMM). The arrangement maximizes the number of objects (also referred to as parts and/or workpieces) positioned in the measurement space of the CMM, such that the CMM can measure the objects without interference from the objects and/or the fixtures that support the objects. To that end, the method generates a 3D virtual movement model representing the volume (a virtual movement volume model) through which movable components of the CMM move through the measurement space to measure the objects. Using the movement model and the virtual model of the object(s) (e.g., a CAD model of the workpiece), the method determines, and subsequently verifies, an appropriate position and orientation of one or more objects within the measurement space. Next, the method may physically/mechanically position and orient the objects (and/or a fixture holding the objects) in the measurement space of the CMM in accordance with the prescribed orientation determined by the system.

In illustrative embodiments, the method also efficiently measures multiple objects after they are placed in the measurement space in accordance with the previously described efficient method. To that end, illustrative embodiments may measure two or more objects in an efficient pattern. For example, the CMM does not have to complete measurement of all features of a first object, it can instead move to a feature of a second object after measuring a portion of the first object. Used with the movement model described previously, this efficient measurement allows the CMM to measure two or more respective objects without causing a collision between a moving part of the CMM and the objects. Details of illustrative embodiments are discussed below.

Figure 1A:
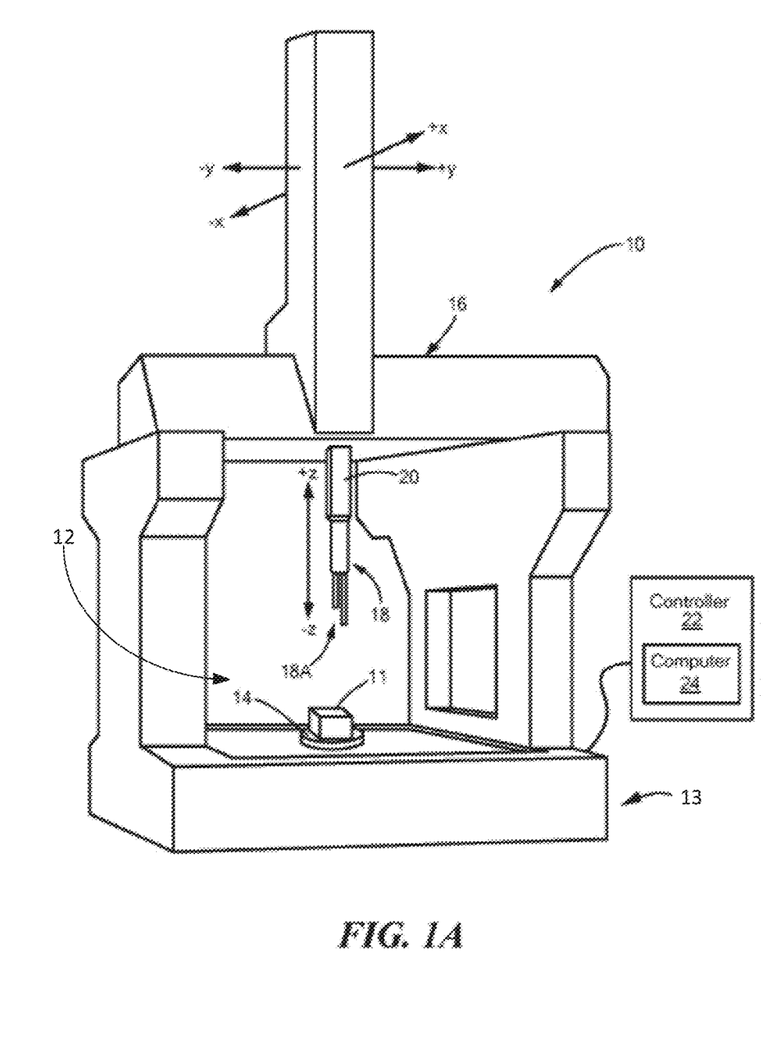
FIG. 1A schematically shows a coordinate measuring machine (CMM) that may be configured in accordance with illustrative embodiments of the invention.

FIG. 1A schematically shows of one type of coordinate measuring machine 10 (i.e., a CMM system, also referred to below as "CMM 10") that may be configured in accordance with illustrative embodiments. This CMM 10 is but one of a number of different types of CMMs that may implement various embodiments. Accordingly, such a CMM is not intended to limit various embodiments of the invention.

As known by those in the art, the CMM 10, measures an object 11 (also referred to as a part or work piece) on its bed/base (referred to as "base 13"), which may be formed from granite or other material. Generally, the base 13 defines an X-Y plane that typically is parallel to the plane of the floor supporting the CMM 10. In some embodiments, the base 13 supports a rotary table 14 that controllably rotates the object 11 relative to the base 13. Sometimes, a fixture (not shown in FIG. 1, but shown in FIG. 4, discussed below) secures and orients the object 11 on the base 13.

To measure the object 11, the CMM 10 has movable components 16 (e.g., a carriage and other components not shown in FIG. 1A) arranged to move a measuring device 18, such as one or more contact or non-contact (e.g., optical) probes 18A coupled with a movable arm 20. Alternately, some embodiments move the base 13 with respect to a stationary measuring device 18. Either way, the movable components 16 of the CMM 10 manipulate the relative positions of the measuring device 18 and the object 11 to obtain the desired measurement within a measurement space 12 of the CMM 10. In either case, the movable components 16 (and its arm 20, discussed below) are movable relative to the base 13.

The CMM 10 has a control system 22 that controls and coordinates its movements and activities (shown schematically in FIG. 1A as "controller 22"), which may be internal to the CMM 10, external to the CMM 10, or have both internal and external components. Among other things, the control system 22 preferably includes hardware, such as dedicated hardware systems and/or computer processor hardware. Among other things, the computer processor may include a microprocessor, such as a member of the Intel "Core i7 or i9" family of integrated circuit microprocessors available from Intel Corporation, or a digital signal processor, such as a member of the TMS320C66x family of digital signal processor integrated circuits from Texas Instruments Incorporated. The computer processor has on-board digital memory for storing data and/or computer code, including instructions for implementing some or all of the control system operations and methods. Alternatively, or in addition, the computer processor may be operably coupled to other digital memory, such as RAM or ROM, or a programmable memory circuit for storing such computer code and/or control data.

Alternatively, or additionally, some embodiments couple the CMM 10 with an external computer system 24 ("host computer 24"). Although FIG. 1A shows the computer system 24 as part of the control system, those skilled in the art should understand that it may be separate from the control system 22. In a manner similar to the control system 22, the host computer 24 has a computer processor such as those described above, and computer memory in communication with the processor of the CMM 10. The memory is configured to hold non-transient computer instructions capable of being executed by its processor, and/or to store non-transient data, such as 1) scan path data used to guide the movable portions (e.g., the measuring device 18, a wrist (not shown), movable arm, etc.) during a measurement scan, and/or 2) data acquired as a result of the measurements of the object 11 on the base 13.

Among other things, the host computer system 24 may be implemented as one or both of a desktop computer, a tower computer, or a laptop computer, such as those available from Dell Inc., or even a tablet computer, such as the IPAD available from Apple Inc. The host computer 24 may be coupled to the CMM 10 via a hardwired connection, such as an Ethernet cable, or via a wireless link, such as a Bluetooth link or a WiFi link. As part of the control system 22, the host computer 24 may, for example, include software to control the CMM 10 during use or calibration, and/or may include software configured to process data acquired during a calibration process. In addition, the host computer 24 may include a user interface configured to allow a user to manually or automatically operate the CMM 10.

Because their relative positions typically are determined by the action of the movable components 16, the CMM 10 may be considered as having knowledge about the relative locations of the base 13, the rotary table 14, the object 11 on the rotary table 14, fixturing that supports the object 11, and the measuring device 18. More particularly, the control system 22 and/or computer system 24 may control and store information about the motion of the movable components 16. Additionally, or alternatively, the movable components 16 of some embodiments include sensors that sense the locations of the base 13 and/or measuring device 18, and report that data to the control system 22 and/or the computer system 24. The information about the motion and position of the base 13 and/or measuring device 18 of the CMM 10 may be recorded in terms of a one-dimensional, two-dimensional (e.g., X-Y; X-Z; Y-Z) or three-dimensional (X-Y-Z) coordinate system referenced to a point on the CMM 10.

The CMM 10 may have more than three degrees of freedom; i.e., more degrees of freedom in this example than in the X, Y, and Z directions. For example, the end of the arm 20 may include a wrist mechanism (noted above but not shown) that rotates the measuring device 18/18A, thus providing up to three more degrees of freedom.

Figure 1B:
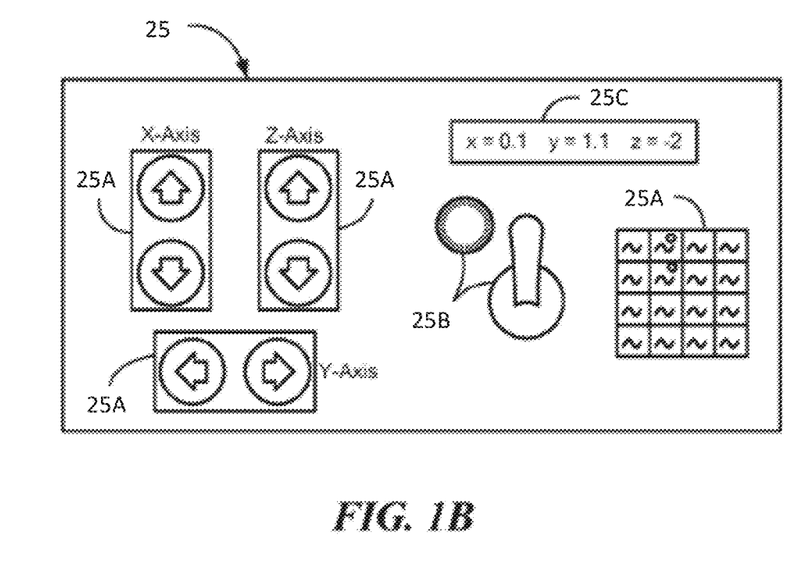
FIG. 1B schematically shows a user interface that may be used with the CMM of FIG. 1A.

Some CMMs 10 also include a manual user interface 25 as schematically illustrated in FIG. 1B. Among other things, the manual interface 25 may enable the user to change the position of the measuring device 18 or base 13/rotary table 14 (e.g., with respect to one another), and to record data relating to the position of the measuring device 18 or base 13/rotary table 14. To that end, the manual user interface 25 may have control buttons 25A and joysticks or knobs 25B that allow a user to manually operate the CMM 10. The interface 25 also may have a display window 25C (e.g., a liquid crystal display) for showing system positions, and programming certain functions and positions of the measuring device 18 or base 13. Of course, the manual interface 25 may have a number of other components and thus, the components 25A-25C shown in this drawing are for illustrative purposes only. Other embodiments may omit this manual interface 25. In illustrative embodiments, since the measuring process typically is automated, this interface 25 may not be used.

In a moving table CMM 10, for example, the measuring device 18 may also be movable via control buttons 25A. As such, the movable components 16 may respond to manual control, or be under control of an internal computer processor, to move the base 13 and/or the measuring device 18 (e.g., a mechanical probe or a laser probe in a mechanical CMM 10) relative to one another. Accordingly, this arrangement permits the object 11 being measured to be presented to the measuring device 18 from a variety of angles, and in a variety of positions.

Although FIG. 1B schematically shows the manual user interface 25, it should be understood that in various embodiments, the motion of the CMM 10 is controlled automatically. For example, as described further below, logic may automatically determine how to (1) arrange multiple objects 11 within the measurement space 12, and/or (2) measure multiple objects 11 within the measurement space 12.

Figure 2:
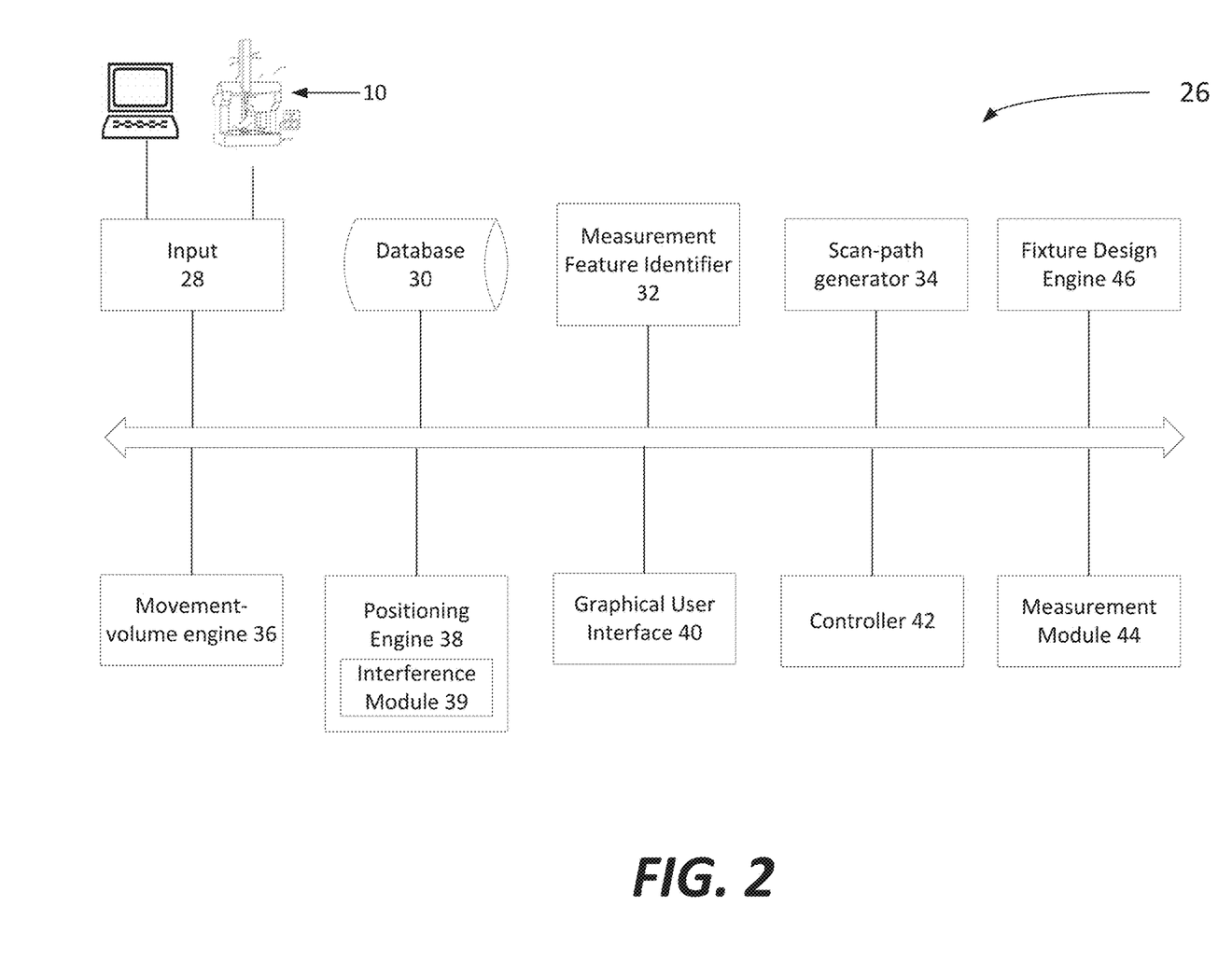
FIG. 2 shows details of an object positioning system in accordance with illustrative embodiments of the invention

FIG. 2 shows details of an object positioning system 26 in accordance with illustrative embodiments of the invention. The positioning system 26 provides instructions, either to a human operator or to a robot, to arrange objects 11 in the measurement space 12 of the CMM 10 in a prescribed position and orientation. Preferably, the positioning system 26 arranges the objects 11 such that the CMM 10 can measure the objects 11 without interference from the objects 11 and/or the fixtures that support the objects 11.

To that end, the positioning system 26 includes an input 28 configured to receive a three-dimensional model of one or more objects 11 to be measured (e.g., from a user on a computer and/or the CMM 10). For example, the model of the object 11 may be a CAD model. In some embodiments, the model includes a fixture configured to hold the object 11 (e.g., couple the object 11 to a fixture plate). However, in some other embodiments, the object 11 model may not include the fixture. Generally, the object 11 being measured is manufactured (e.g., injection molded) on the basis of some underlying three-dimensional model with nominal object 11 specifications—i.e., the object 11 model. The object 11 model generally includes the ideal specifications of the object 11, including measurements for various dimensions. In various embodiments, the object 11 is measured by the CMM 10 to compare the physical dimensions of the object 11 with the nominal dimensions in the model.

The positioning system 26 also includes a database 30, where the various models for different types of objects 11 may be stored. The database 30 may also include information relating to the CMM 10. For example, the database 30 may include information about the make and model of the CMM 10, in addition to information regarding the movable components 16. As an additional example, the database 30 may have information relating to the size and dimensions of the various movable components 16 (e.g., make and model of probe 18A with associated dimensions). Furthermore, the database 30 may include information (e.g., a CAD model) relating to the fixture that corresponds to each particular object 11. Alternatively, the above described information may be received through the input 28.

A measurement feature identifier 32 communicates with the database 30 and/or the input 28, and determines what features of the object 11 to measure. The measurement feature identifier 32 may be pre-programmed to select certain features to measure based on the identification of a particular type of object 11. For example, for a particular rectangular part, the measurement feature identifier 32 may determine that two edges should be measured. Alternatively, the feature to be measured may be selected by the user through the input 28. The measurement feature identifier 32 communicates with a scan path generator 34, and informs it regarding the one or more features to be measured.

A scan path generator 34 communicates with the measurement feature identifier 32 and determines what features of the object 11 to measure. After the features are determined, the scan path generator 34 generates a scan path to measure that feature. For example, the scan path generator 34 may have preconfigured part programs that correspond to respective objects 11 and/or features. Additionally, or alternatively, the scan path generator 34 may generate a new scan path.

The system 26 includes a movement-volume engine 36 configured to generate a virtual movement volume model (referred to herein simply as a volume model). As described previously, the volume model represents the volume through which the movable components 16 of the CMM 10 move to measure the object 11 and/or features determined by feature identifier 32 (e.g., along a scan path generated by the scan-path generator 34). The movement-volume engine 36 receives the information relating to the movable components 16 as well as the features to be measured and/or the scan path, and generates the volume model. In some embodiments, the movement-volume engine 36 virtually executes the motion of the CMM 10 and records that motion in such a way to represent the external boundaries of the measurement volume (e.g., in the form of a contiguous solid model).

A positioning engine 38 is configured to instruct a user and/or a robot to position the object 11 at a particular position and orientation within the measurement space 12. To that end, the positioning engine 38 communicates with the input and/or database to receive information relating to the object 11. The positioning engine 38 also communicates with the measurement feature identifier 32 to receive information relating to the feature to be measured. Furthermore, the positioning engine 38 communicates with the volume engine 36 to receive information to the volume model.

The positioning engine 38 uses this information to efficiently position multiple objects 11 in the measurement space 12 such that all of the desired features are measurable while not interfering with any of the objects 11 and/or their fixtures. An interference module 39 determines whether there is any interference between the virtual object 11, the virtual movement volume model 48, and/or the virtual fixture. If there is interference, then the positioning engine 38 adjusts the positioning and/or orientation of the object. In preferred embodiments, the efficient positioning maximizes the number of objects positioned in the measurement space 12 of the CMM 10, such that the CMM can measure the objects without interference from the objects and/or the fixtures that support the objects.

To that end, the system 26 includes a graphical user interface 40. The graphical user interface 40 may instruct the user as to how to position the objects 11 in accordance with the positioning defined by the positioning engine 38. For example, the graphical user interface 40 may send information via augmented reality (e.g., smartphone camera, AI glasses) to the user, instructing them as to how to position the objects 11. Alternatively, or additionally, the system 26 includes a robot controller 42 configured to control a robot to automatically position the objects 11 as requested.

An efficient measurement module 44 may communicate with the positioning engine 38, and determine an efficient measurement route for two or more objects 11. Particularly, the efficient measurement module 44 instructs the CMM 10 to most efficiently measure the one or more objects 11. Rather than necessarily measuring a single object 11 from beginning to end, the CMM 10 instead may move from object 11 to object 11 in the most efficient pattern. For example, the CMM 10 may measure a portion of a first object, a portion of a second object, and then return to the first object at a later time. The measurement module 44 then sends a control signal to the CMM 10 instructing it to perform the measurement in the efficient order.

The system 26 may also include a fixture design engine 46 configured to receive information relating to the object 11 and the measurement volume along the scan path. The fixture design engine 46 identifies one or more portions of the object 11 available for support without interfering with movement of the CMM 10. Accordingly, these portions may include surfaces for mounting with the fixture. Thus, illustrative embodiments may advantageously allow for the design of a fixture that accounts for the shape of the object 11, the feature to be measured, and the measurement volume occupied by the CMM 10 while conducting the measurement. As described previously, some objects 11 may already have a validated fixture, and therefore, do not need to design a new fixture using the fixture design engine 46. However, in some embodiments, a pre-validated fixture may be revised in order to be validated for a different measurement procedure (e.g., along a different scan path).

Each of the above-described components is operatively connected by any conventional interconnect mechanism. FIG. 2 simply shows a bus communicating each of the components. Those skilled in the art should understand that this generalized representation can be modified to include other conventional direct or indirect connections. Accordingly, discussion of a bus is not intended to limit various embodiments.

Indeed, it should be noted that FIG. 2 only schematically shows each of these components. Those skilled in the art should understand that each of these components can be implemented in a variety of conventional manners, such as by using hardware, software, or a combination of hardware and software, across one or more other functional components. For example, the positioning engine 38 may be implemented using a plurality of microprocessors executing firmware. As another example, the movement-volume engine 36 may be implemented using one or more application specific integrated circuits (i.e., "ASICs") and related software, or a combination of ASICs, discrete electronic components (e.g., transistors), and microprocessors. Accordingly, the representation of the movement volume engine 36 and other components in a single box of FIG. 2 is for simplicity purposes only. In fact, in some embodiments, the movement volume engine 36 of FIG. 2 is distributed across a plurality of different machines—not necessarily within the same housing or chassis. Additionally, in some embodiments, components shown as separate (such as the scan-path generator 34 and the movement-volume engine 36 in FIG. 2) may be replaced by a single component. Furthermore, certain components and sub-components in FIG. 2 are optional. For example, some embodiments may not use the fixture design engine 46.

It should be reiterated that the representation of FIG. 2 is a significantly simplified representation of an object positioning system 26. Those skilled in the art should understand that such a system may have other physical and functional components, such as central processing units, other packet processing modules, and short-term memory. Accordingly, this discussion is not intended to suggest that FIG. 2 represents all of the elements of an object positioning system 26.

Figure 3:
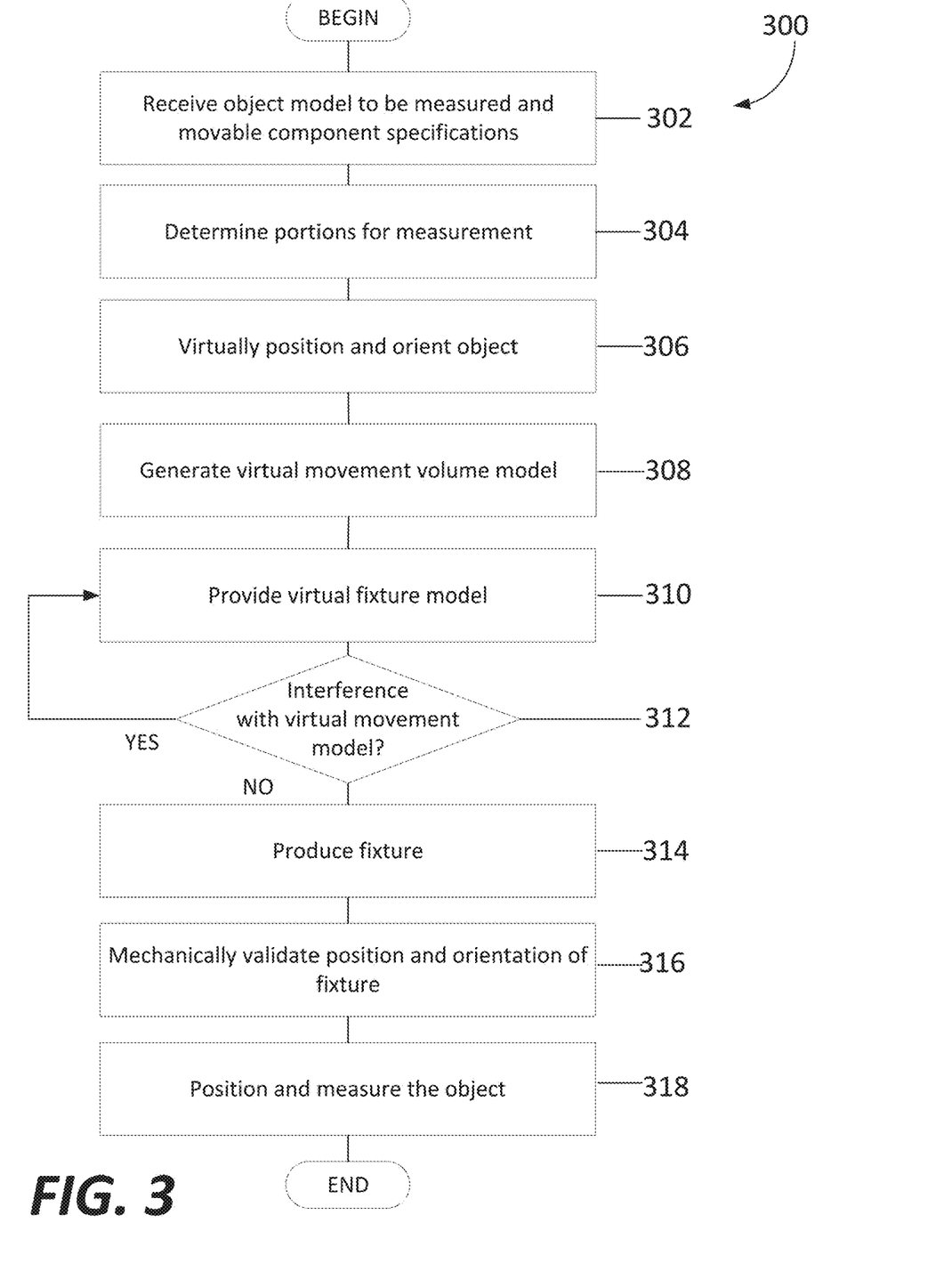
FIG. 3 shows a process of designing and validating a fixture for the object in accordance with illustrative embodiments of the invention.

FIG. 3 shows a process 300 of designing and validating a fixture for the object 11 in accordance with illustrative embodiments of the invention. By validating the fixture using logic (e.g., the fixture design engine 46), the fixture can be used with a corresponding object 11 without requiring multiple physical iterations during testing/use.

The process 300 begins at step 302, which receives the object 11 model and the movable component 16 specifications. As described previously, the object 11 model and/or movable component 16 specifications may be received from the database 30 and/or the input 28. The object 11 model preferably has the various dimensions of the object. In the present process 300, it is assumed that the object 11 model does not include a fixture.

Figure 4:
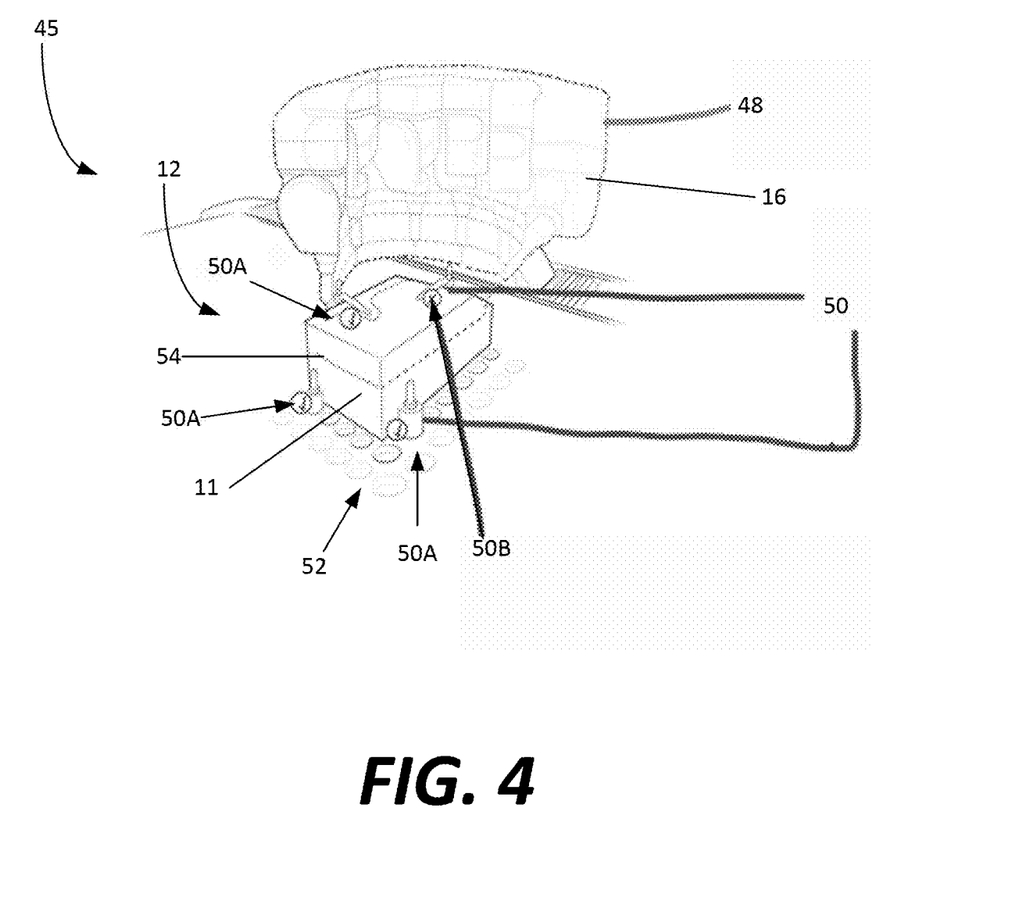
FIG. 4 schematically shows a virtual environment for designing and validating a fixture in accordance with illustrative embodiments of the invention.

FIG. 4 schematically shows a virtual environment 45 for designing and validating the fixture 50 in accordance with illustrative embodiments of the invention. Specifically, FIG. 4 shows the object 11 model, the movement volume model 48, a virtual fixture 50, and a virtual fixture plate 52 in accordance with illustrative embodiment of the invention. The virtual environment 45 may be displayed via the graphical user interface 40.

The process 300 then proceeds to step 304, which determines portions (e.g., features) of the object 11 that are to be measured. The feature identifier 32 may automatically select a feature, and the scan-path generator may initiate a virtual part program that corresponds to the object 11 selected in step 302. The virtual part program may include one or more scan paths 54. Alternatively, the user may input one or more of the scan paths 54.

The process 300 then proceeds to step 306, which virtually positions and orients the object 11 (e.g., as shown in FIG. 4). The object 11 model may be displayed on a display device, or kept internally as data to generate relevant directions for the operator or logic.

The process then proceeds to step 308, which generates a virtual movement volume model 48 on the basis of the features to be measured (e.g., along the generated scan path). As described previously, the volume model 48 relates to the volume occupied by the movable components 16 as they measure the object 11 along the one or more scan paths 54. In other words, the 3D virtual movement volume model 48 represents a three-dimensional volume defined by movement of the moveable components 16 of the CMM 10 during the measurement process. In some embodiments, the virtual movement model 48 may displayed in the virtual environment 45 with the object 11 model. However, in some other embodiments, the system 26 merely considers the data representing the same.

When the volume model 48 is combined with the object 11, an operator or logic can more readily identify one or more portions of the object 11 available for support without interfering with movement of the CMM 10. For example, these portions may include surfaces for mounting with a fixture 50 (i.e., fixture components 50A and 50B).

More specifically, this step may combine the 3D virtual model of the object 11 with the 3D virtual movement volume model 48 to form the combined model 49, and then use the combined model 49 to identify areas of the object 11 that are not covered or otherwise in contact with the 3D virtual movement model 48. This step may analyze all such areas to determine which are suitable for supporting the object 11 and determine preferred orientation of the object 11. This information should be at least partly sufficient to design the fixture 50, if needed, for the object 11 to be measured within the CMM measurement region 12.

The process 300 then proceeds to step 310, which provides the virtual fixture 50 model. In various embodiments, the virtual fixture 50 may be provided by the database 30 and/or the input 28. Alternatively, the system 26 may generate a fixture model. FIG. 4 schematically shows the virtual fixture 50. As can be seen, the fixture 50 has many fixture components 50A and 50B. Like many fixture components 50A and 50B, they may be threadably and/or magnetically engaged with the fixture plate 52.

The process 300 then determines whether there is interference between the virtual movement model 48 and the virtual object 11 and/or the virtual fixture 50. FIG. 4, for example, schematically shows the virtual movement model 48 relative to the object 11 and the fixture 50. Generally, when a single object 11 is in the measurement space 12 at a time, interference between the movement volume model 48 and the object 11 is unlikely, as the scan path 54 is generated specifically to measure the object 11. However, when considering a single object 11, it is possible that the fixture 50 may interfere with the movement volume model 48.

With reference to the example of FIG. 4, the interference module 39 checks (i.e., virtually) for interference between the movement volume model 48 and the object 11. Seeing that there is no interference, the interference module 39 checks for interference between the movement model 48 and the fixture 50. Specifically, the interference module 39 determines that three fixture components 50A do not interfere with the movement volume model 48. However, the interference module 39 determines that there is a single fixture component 50B interfering with the volume model 48.

When there is interference with the virtual movement volume model 48, the process returns to step 310, and a new virtual fixture 50 model is provided. In some embodiments, the fixture design engine 46 identifies one or more portions of the object 11 available for support without interfering with movement of the CMM 10. Accordingly, these portions may include surfaces for mounting with the fixture 50. Thus, illustrative embodiments may advantageously allow for the design of the fixture 50 as a function of the size and shape of the object 11, the feature to be measured, and the movement volume model 48. Accordingly, the fixture 50 may be introduced into the measurement process without requiring multiple iterations of physical testing and validation.

In embodiments where the volume model 48 is combined with the object 11 model prior to generating the virtual fixture 50, then the process flows efficiently and generally does not have to repeat step 310. This is because the fixture 50 is specifically generated as a function of these models (object 11 model and volume model 48).

The process then returns to step 312. If there is no interference with the virtual movement volume model 48, then the process proceeds to step 314. After step 312 effectively virtually validates mounting, positioning and/or orientation, the process 300 continues to step 314, which produces the fixture 50 based at least in part on the 3D virtual movement volume model 48. Next, step 316 mechanically validates the position and orientation of the object 11 in the actual measurement space 12 of the CMM 10. Now, the object 11 is prepared for measurement operations. At this point, the process proceeds to step 318, and the operator and/or robot positions the object 11 as required, and enables the CMM 10 to measure the object 11.

Although this process 300 is with reference to a single object 11, it should be understood that multiple objects may be used. Furthermore, multiple different object types may be used (e.g., objects 11 having a rectangular shape and objects 11 having a circular shape). In some embodiments, the CMM 10 measures more than one object 11 on the base 13. For example, the base 13 may support two objects 11, three objects 11, a random arrangement of objects 11, or a two-dimensional array of objects 11. To that end, illustrative embodiments position the combined virtual object model and the virtual 3D movement model in the measurement space of the CMM 10.

Figure 5:
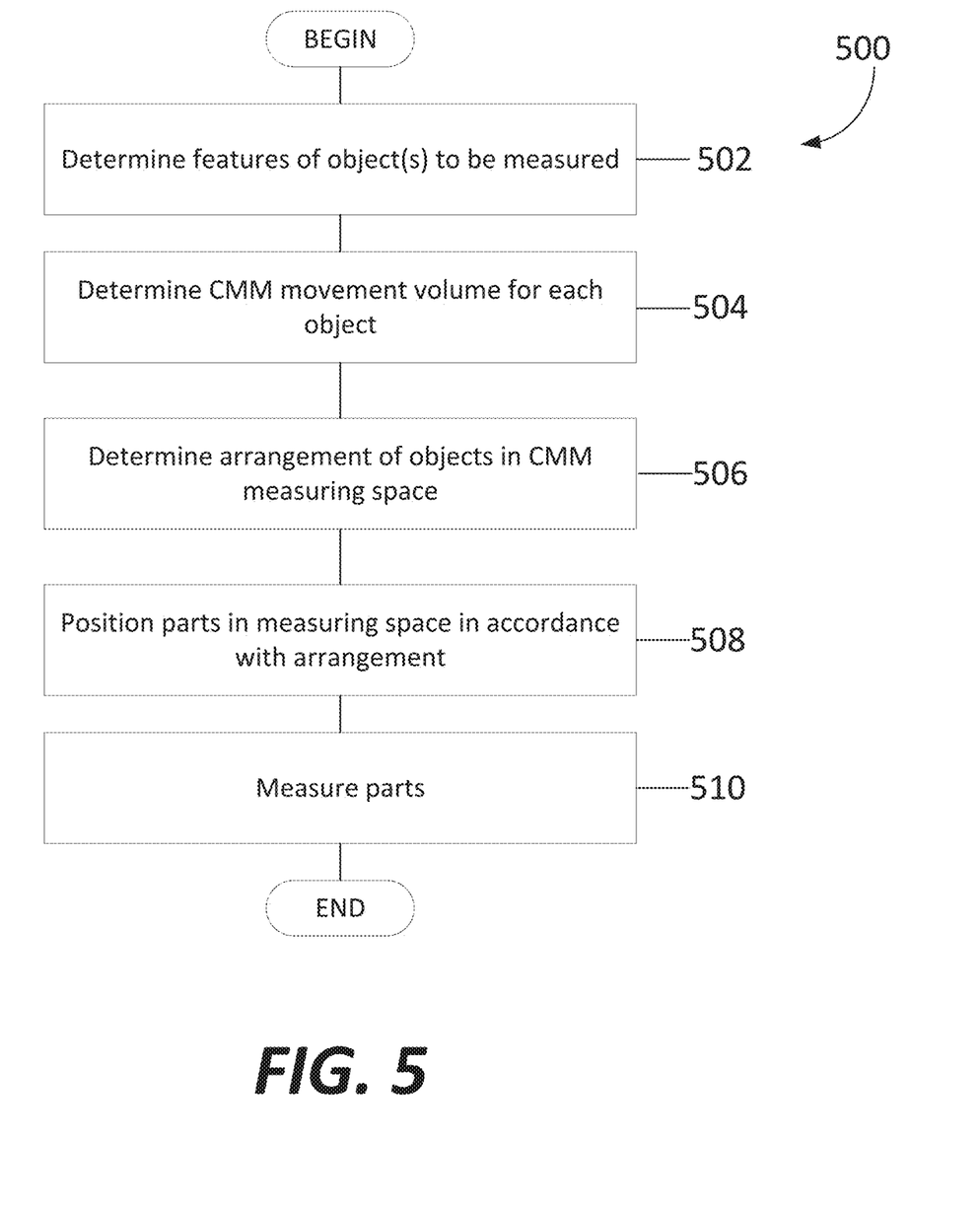
FIG. 5 shows a process of measuring an object in accordance with illustrative embodiments of the invention.

FIG. 5 shows a process of measuring an object 11 in accordance with illustrative embodiments of the invention. It should be noted that this process is substantially simplified from a longer process that normally would be used to measure an object 11. Accordingly, the process of measuring has many steps that those skilled in the art likely would use. In addition, some of the steps may be performed in a different order than that shown, or at the same time. Those skilled in the art therefore can modify the process as appropriate. Moreover, as noted above and below, some of the materials and structures noted are but one of a wide variety of different materials and structures that may be used. Those skilled in the art can select the appropriate materials and structures depending upon the application and other constraints. Accordingly, discussion of specific materials and structures is not intended to limit all embodiments.

The process of FIG. 5 begins at step 502 by determining portions and/or features of the object 11 to measure. To that end, the user may manually select features of the object 11 (e.g., on a CAD model). Additionally, or alternatively, the system 26 may include an object 11 identifying device (e.g., a camera with logic configured to identify the part) and automatically determine features to measure. While illustrative embodiments contemplate using a plurality of the same object 11 type (e.g., a particular type and model of an object that are manufactured on the basis of the same CAD model), other embodiments may determine features to measure on more than one type of object 11 (e.g., objects 11 that have different CAD models).

Figure 6A:
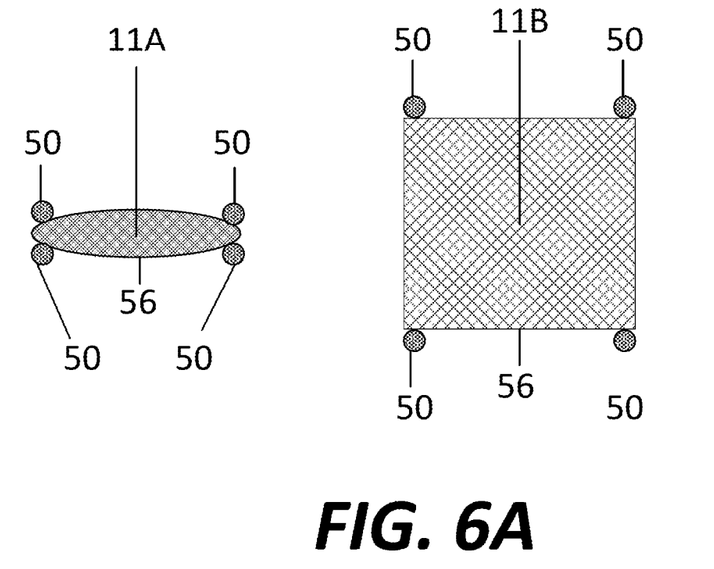
FIG. 6A schematically shows a top view of object models for two different objects in accordance with illustrative embodiments of the invention.

FIG. 6A schematically shows a top view of models for two different objects 11 (object 11A and object 11B) including fixture components 50 in accordance with illustrative embodiments of the invention. Generally, each object 11 has a predefined fixture 50 configured to hold the object 11 in place on a fixture plate (not shown in FIG. 3A). The fixture plate (not shown) is positioned on the CMM base 13 within the measurement space 12 of the CMM, and the object 11 is positioned on the fixture plate via the fixture components 50. However, although fixture components 50 are shown, in some embodiments, the object 11 model may not include a fixture/fixture components 50. Instead, the object 11 may directly be positioned within the measurement space 12 without the fixture 50. For objects 11 having an associated fixture 50, the model of the fixture 50 is generally known (e.g., because the fixture has to be assembled to hold the object 11).

The process then proceeds to step 504, which determines a movement volume model 48 (also referred to as a movement model 48). The list of features of interest to be measured determined in step 502 (e.g., measure the top outer perimeter 56 of each object 11A and 11B) are associated with corresponding geometric surfaces and datum surfaces of the virtual model of the object 11 to acquire data defining the features. With that information, the process 500 creates the volume model 48, which represents the motion of the CMM 10 required to execute the data acquisition process as it moves through the measurement routine. This motion can be said to define a volume that is represented by the movement volume model 48.

Figure 6B:
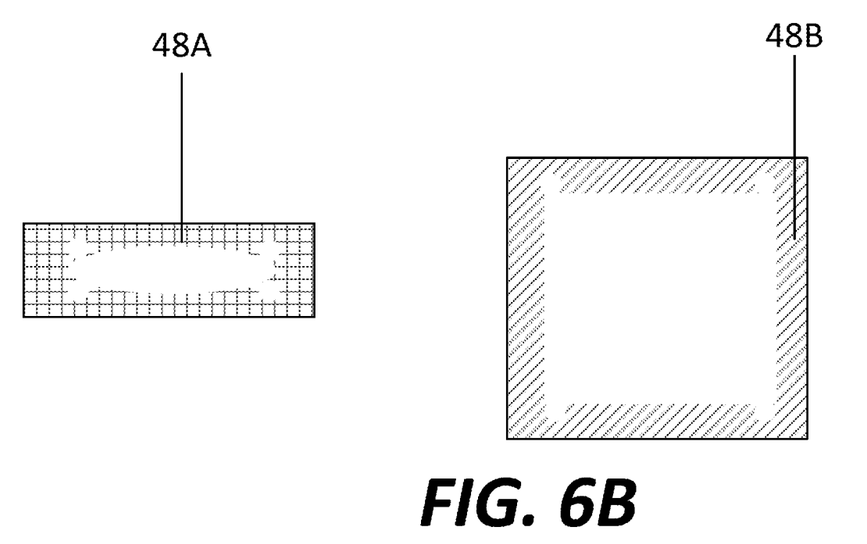
FIG. 6B schematically shows a top view of the movement volume model for each respective object in accordance with illustrative embodiments of the invention.

FIG. 6B schematically shows a top view of the movement volume models 48A and 48B for each respective object 11A and 11B in accordance with illustrative embodiments of the invention. It should be understood that the movement volume model 48 shown is simplified for discussion purposes. The shape of the illustrated virtual movement volume model 48 is not intended to limit various embodiments, nor is it accurate. Simplified rectangular movement volume models 48 are shown for discussion purposes. Furthermore, the movement volume model 48 is generally a three-dimensional volume (as shown in FIG. 4), but is shown in two-dimensions for discussion purposes.

Step 506 then determines the arrangement of the objects 11. Specifically, the objects 11 are positioned and oriented within the measurement space 12 so that respective measurement volume models 48 do not interfere with the objects 11 and/or fixtures 50.

Figure 6C:
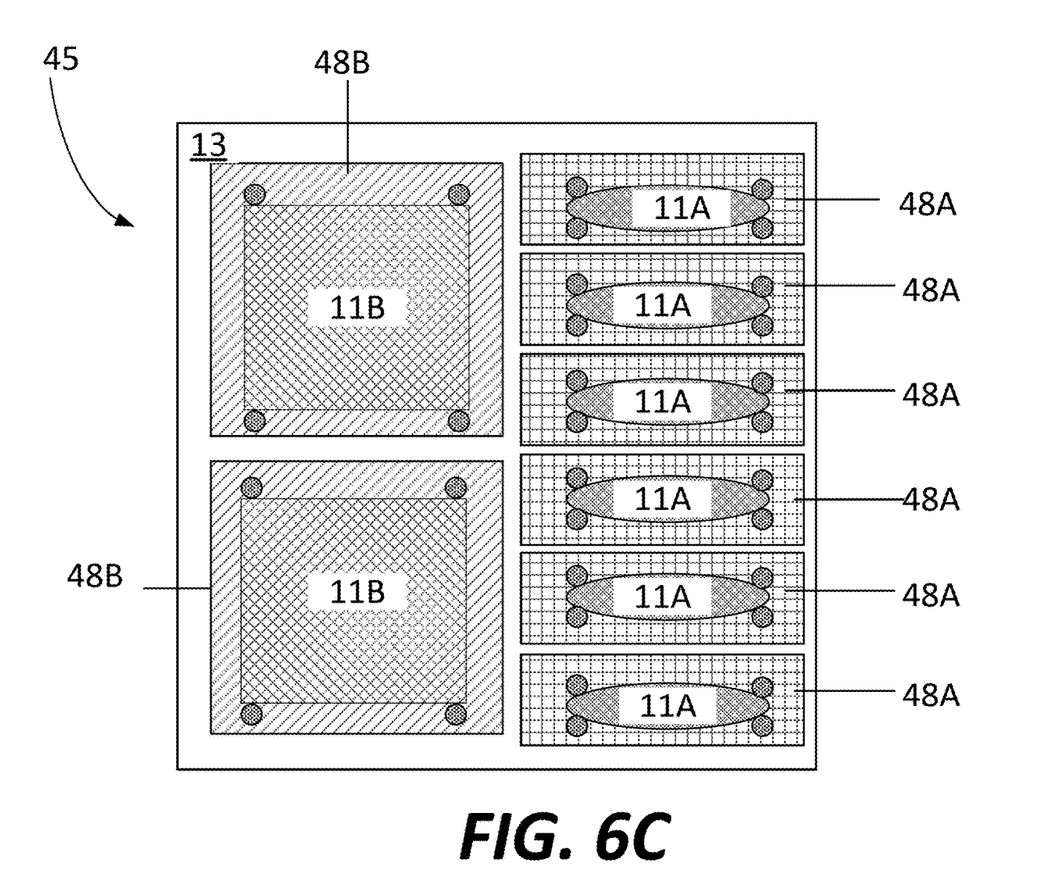
FIG. 6C schematically shows a virtual combination of the movement volume model and the object model for a plurality of objects in accordance with illustrative embodiments of the invention.

FIG. 6C schematically shows a top view of an arrangement of a plurality of objects 11A and 11B to be measured in accordance with illustrative embodiments of the invention. As shown, this step may combine the virtual object 11 models and the virtual 3D virtual movement models 48. This combination may be displayed on a display device, or kept internally as data to generate relevant directions for the operator or logic. FIG. 6C also virtually shows the CMM table 13.

The objects 11 are positioned and oriented by the positioning engine 38 such that they efficiently fit on the table 13. In contrast to the prior art, illustrative embodiments position the object(s) 11 on the table as a function of the virtual movement volume model 48. In the example of FIG. 6C, two large objects 11B and six small objects 11A are positioned to maximize the usage of the measurement space 12 on the table 13. The configuration may change, however, based on the objects 11 being measured. If only the smaller objects 11A are measured, then twelve smaller objects 11A may be positioned on the table 13 simultaneously. The positioning engine 38 includes logic that efficiently positions the combination of object 11 models and measurement volume models 48 within the bounds of the virtual table 13.

For ease of visualization, the various volume models 48A and 48B are shown as not having any overlap. However, in some embodiments, the objects 11 may be positioned such that the volume models 48 do have overlap. The positioning engine 38 confirms that the various volume models 48A and 48B do not overlap/interfere with the objects 11 and/or fixtures 50. Thus, the object 11 positions determined by the positioning engine 38 may allow for overlap of volume models 48. However, in embodiments where the CMM 10 has multiple probes 18 measuring objects 11 on the same table 13 simultaneously, then the objects 11 may be positioned such that the volume models 48 do not overlap (i.e., to prevent interference between two or more probes 18 and/or other moving components 16).

Figure 6D:
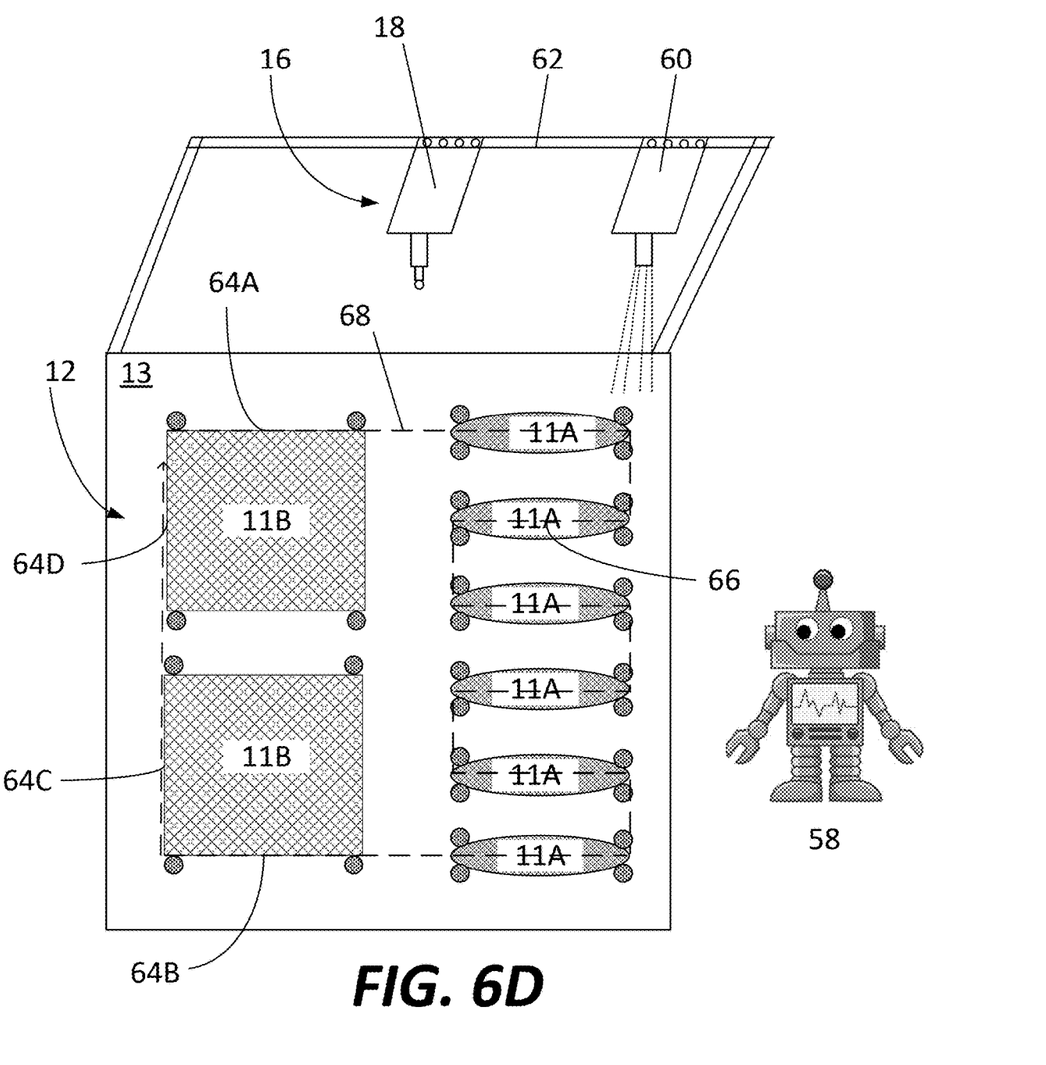
FIG. 6D schematically shows a top view of a CMM table with the objects positioned thereon to be measured in accordance with illustrative embodiments of the invention.

The process then proceeds to step 508, which physically positions the objects 11 in the measurement space 12 in accordance with the position and orientation determined in step 506. FIG. 6D schematically shows a top view of a CMM table 13 with the objects 11 positioned thereon in accordance with illustrative embodiments of the invention. For example, the robot 58 may position the objects 11A and/or 11B as determined by step 506. Alternatively, a human user may position the objects 11A and/or 11B in accordance with the position and orientation determined in step 506. For example, the user may be guided by augmented reality (e.g., in a smartphone) and/or a light source 60 (e.g., on a movable carriage 62) showing where each fixture component 50 and/or object should be positioned. It should be understood that while FIG. 6C may show a virtual environment 45 including the models of the object 11, FIG. 6D is an arrangement of the physical object 11 in the real world.

The process then proceeds to step 510, which measures the one or more objects 11. As shown in FIG. 6D, eight objects 11A and 11B are measured. Some embodiments may efficiently measure the objects 11A and 11B. To that end, the efficient measurement module 44 may communicate with the positioning engine 38, and determine an efficient measurement route 68 for two or more objects 11. Particularly, the efficient measurement module 44 instructs the CMM 10 to efficiently measure the objects 11, rather than necessarily measuring a single object 11 from beginning to end.

For example, if two sides 64 of each rectangular object 11B are to be measured, as well as the length 66 of each elliptical object 11A, the measurement path 68 may be as follows: measure side 64A, then measure length of all objects 11A, measure side 64B, and finally measure side 64D. This is in contrast to prior art methods, which measure the entirety of a single object (e.g., both sides 64A and 64D) before moving to another object.

It should be understood that various embodiment provide a number of advantages. As an initial matter, a plurality of objects 11 may simultaneously be positioned on the table/base 13 during measurement. This is contrast to prior art methods that position a single object 11 on the base 13 during measurement. Advantageously, the system 26 and methods described herein allow for measurement of a first object 11 while two or more objects 11 are simultaneously on the table 13 without causing interference between the CMM 10 and the other objects 11 and/or fixtures 50.

Illustrative embodiments also maximize usage of the table/base 13 of the CMM 10. Accordingly, a number of objects may be efficiently positioned on the table/base 13. CMM 10 measurements tend to take long periods of time. As described herein, a number of objects 11 to be measured may be positioned on the table, eliminating the need for an operator to constantly watch over the CMM 10 and switch objects 11 when they are finished being measured. Instead, illustrative embodiments allow the CMM 10 to perform bulk measurements on a plurality of objects 11 and take advantage of prior art CMM down-times (e.g., overnight, during the weekend).

Furthermore, illustrative embodiments speed up measurements by measuring the plurality of objects simultaneously. Therefore, the CMM 10 prioritizes efficiency by making the measurements that are most expedient, rather than completing the measurement of a single object 11 at a time.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as a pre-configured, stand-along hardware element and/or as preprogrammed hardware elements (e.g., application specific integrated circuits, FPGAs, and digital signal processors), or other related components.

In an alternative embodiment, the disclosed apparatus and methods (e.g., see the various flow charts described above) may be implemented as a computer program product for use with a computer system. Such implementation may include a series of computer instructions fixed either on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

The embodiments of the invention described above are intended to be merely exemplary; numerous variations and modifications will be apparent to those skilled in the art. Such variations and modifications are intended to be within the scope of the various embodiments.

What is claimed is:

1. A method of measuring a given object using a coordinate measuring machine (CMM) having a measurement space, the method comprising:
    determining one or more portions of the given object to be measured;
    forming a virtual movement volume model representing movement of the CMM used to measure the one or more portions; and
    virtually positioning and orienting the given object within the CMM measurement space as a function of the movement volume model.

2. The method of claim 1 wherein using comprises using the virtual movement volume model to virtually coordinate the given object with a fixture.

3. The method of claim 1 wherein using comprises virtually coupling a fixture to one or more surfaces of the given object.

4. The method of claim 1 wherein the given object has a virtual object model, the method comprising combining the virtual object model and the virtual movement volume model, combining identifying one or more portions of the given object available for support without interfering with movement of the CMM.

5. The method of claim 4 wherein combining comprises displaying the combined virtual object model and the virtual movement volume model.

6. The method of claim 1 further comprising producing a fixture as a function of the virtual movement volume model.

7. The method of claim 1 further comprising mechanically validating the virtual position and orientation of the given object within the CMM measurement space.

8. The method of claim 7 further comprising making a fixture as a function of the validation.

9. The method of claim 1 further comprising virtually positioning a second virtual movement volume model in the CMM measurement space, the second virtual movement volume model being formed for a second object to be measured.

10. The method of claim 9 further comprising:
    providing a virtual object corresponding to the given object;
    providing a second virtual object model corresponding to the second object;
    modifying the position and/or orientation of the second virtual movement volume model when the second virtual movement volume model overlaps with the virtual object model; and/or
    modifying the position and/or orientation of the given virtual movement volume model when the given virtual movement volume model overlaps with the second virtual object model.

11. The method of claim 1 further comprising measuring the given object after virtual positioning and virtual orientation.

12. The method of claim 1 wherein the CMM comprises a probe, further wherein movement of the CMM required to measure the one or more portions includes movement of the CMM probe.

13. A system for measuring a plurality of objects with a coordinate measuring machine (CMM), the CMM having movable components and a base on which the objects are positioned, the system comprising:
   an object model configured to represent an object;
   a scan-path generator configured to generate a scan path for one or more features of the object to be measured;
   a movement-volume engine configured to generate a virtual movement volume model representing movement of the movable components of the CMM required to measure the one or more features;
   a positioning engine configured to determine a position and an orientation of the object on a base of the CMM such that the virtual movement volume model does not have interference from a fixture of the object and/or a second object positioned on the base.

14. The system as defined by claim 13, further comprising a measurement module configured to efficiently measure a plurality of objects on the base.

15. The system as defined by claim 13, further comprising a CMM.

16. The system as defined by claim 13, further comprising a second object model configured to represent a second object, wherein the movement-volume engine is configured to generate a second virtual movement volume model, the positioning engine is further configured to determine a position and an orientation of the first object and the second object on the base such that the first virtual movement volume model and the second virtual movement volume model does not have interference from the fixture of the object, the fixture of the second object, the object, and/or the second object.

17. The system as defined by claim 16, wherein the second object model is different from the first object model.

18. A non-transitory computer-readable medium having stored thereon instructions which, when executed by at least one processor, cause the at least one processor to perform steps of:
   determining one or more portions of a given object to be measured;
   forming a virtual movement volume model representing movement of the CMM required to measure the one or more portions; and
   virtually positioning and orienting the given object within the CMM measurement space as a function of the movement volume model, such that the virtual movement volume model does not have interference from a fixture of the object and/or a second object positioned on the base.

19. The non-transitory computer readable medium of claim 18, wherein the instructions, when executed by at least one processor, cause the at least one processor to perform steps of:
   determining one or more portions of a second given object to be measured;
   forming a second virtual movement volume model representing movement of the CMM required to measure the one or more portions of the second given object; and
   virtually positioning and orienting the second given object within the CMM measurement space as a function of the second movement volume model, such that the second virtual movement volume model does not have interference.

20. The non-transitory computer readable medium of claim 19, wherein the instructions, when executed by at least one processor, cause the at least one processor to perform steps of:
   modifying the position and/or orientation of the second virtual movement volume model when the second virtual movement volume model interferes with the given object model.

* * * * *